UNITED STATES PATENT OFFICE.

GEORG MERLING, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

ESTERS OF DIALKYLAMINOFORMIC ACID.

1,074,966.

Specification of Letters Patent.   Patented Oct. 7, 1913.

No Drawing.   Application filed October 16, 1912. Serial No. 726,065.

*To all whom it may concern:*

Be it known that we, GEORG MERLING and HUGO KÖHLER, doctors of philosophy, chemists, citizens of the German Empire, residing, respectively, at Elberfeld and Leverkusen, near Cologne, Germany, have invented new and useful Improvements in Esters of Dialkylaminoformic Acid, of which the following is a specification.

We have found that the hitherto unknown ammonium halogenids obtainable from trialkylamins and halogen formic acid esters can be decomposed by heating. These ammonium halogenids are obtained *e. g.* using trimethyl amin according to the following equation:

$$Cl.CO.O.R + N.(CH_3)_3 = (CH_3)_3 \underset{Cl}{N} - CO.O.R$$

and the decomposition of these halogenids proceeds according to the equation:

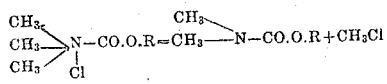

(R meaning aryl), the technically valuable esters of dialkylamino formic acid being obtained which are decomposed by treatment with a caustic alkali into a dialkylamin, carbonic acid and a phenol.

In order to illustrate the new process more fully the following example is given, the parts being by weight:—40 parts of chloroformic-acid-phenyl-ester ($Cl.CO.O.C_6H_5$) are gradually added to 130 parts of benzene solution which has to be cooled and stirred of trimethylamin containing 12.5 per cent. of trimethylamin. The chlorid of the ammonium compound:

separates as a colorless crystalline product. On boiling the mixture under a reflux condenser the crystals gradually dissolve with formation of dimethylamino-formic-acid-phenylester and methyl-chlorid. The operation is finished when the evolution of methyl chlorid ceases. The benzene is distilled off from the solution either at ordinary or reduced pressure and the remaining dimethyl-amino-formic-acid-phenylester is purified by distillation *in vacuo*. The new product forms colorless needles melting at 44–45° C. and boiling without decomposition at 134–135° C. (16 mm.). This ester is obtained in nearly theoretical yield. Other trialkylamins or other halogen-formic-acid-esters can also be used.

We claim:—

1. As new products aryl esters of dialkyl amino-formic acid having the formula

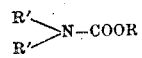

in which R′ means alkyl and R an aryl group which are decomposed by saponification with caustic alkali into dialkyl amin, carbonic acid and a phenol.

2. As new products aryl esters of dimethyl amino-formic acid having the formula

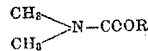

in which R means aryl which are decomposed by saponification with caustic alkali into dimethyl amin, carbonic acid and a phenol.

3. As new products the dialkylamino formic acid phenol esters having the formula

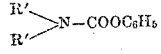

in which R′ means alkyl which are decomposed by saponification with caustic alkali into a dialkyl amin, carbon dioxid and phenol.

4. As a new product the dimethylaminoformic acid phenyl ester having the formula

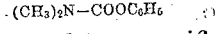

which is decomposed by saponification with caustic alkali into dimethyl amin, carbon dioxid and phenol.

In testimony whereof we have hereunto set our hands in the presence of two subscribing witnesses.

GEORG MERLING. [L. S.]
HUGO KÖHLER. [L. S.]

Witnesses:
ALBERT NUFER,
HERMANN BERTRAMS.